United States Patent [19]

Morel

[11] Patent Number: 4,858,333
[45] Date of Patent: Aug. 22, 1989

[54] CONTINUOUS MONITORING ROLLER FOR THE PROFILE OF A STRIP

[75] Inventor: Michel Morel, Chelles, France
[73] Assignee: Clecim, Cedex, France
[21] Appl. No.: 123,464
[22] Filed: Nov. 20, 1987

[30] Foreign Application Priority Data

Nov. 20, 1986 [FR] France ............................ 86-16178

[51] Int. Cl.$^4$ .............................................. G01B 7/28
[52] U.S. Cl. .......................................... 33/552; 33/533;
33/501.02
[58] Field of Search ...................... 33/552, 533, 147 L,
33/147 N, 148 B, 147 B, 557, 558, 1 BB

[56] References Cited

U.S. PATENT DOCUMENTS

| | | | |
|---|---|---|---|
| 2,748,487 | 6/1956 | Zimmermann | 33/123 |
| 3,805,036 | 4/1974 | Michaud et al. | 33/553 |
| 4,221,053 | 9/1980 | Bobell et al. | 33/552 |
| 4,233,745 | 11/1980 | Ramon et al. | 33/533 X |

Primary Examiner—William A. Cuchlinski, Jr.
Assistant Examiner—Christopher Fulton
Attorney, Agent, or Firm—Pollock, Vande Sande & Priddy

[57] ABSTRACT

There is provided a roller for continuous monitoring of the profile of a strip consisting of a rotary tubular wall (4), to which the strip is applied, and at least one series of pick-ups (2) substantially aligned parallel to the axis of the tubular wall (4). The pick-ups (2) are placed in housings (43) made in the tubular wall (4) with an opening at least in the interior face of the tubular wall. The pick-ups of each series are mounted on a straight support bar (3) centered upon the mean direction of the pick-ups of each series, the bars (3) being applied against the interior face (45) of the wall (4) by detachable fixing means. The device is particularly useful for monitoring the planarity of rolled metal sheets.

8 Claims, 4 Drawing Sheets

CONTINUOUS MONITORING ROLLER FOR THE PROFILE OF A STRIP

FIELD OF THE INVENTION

The invention relates to a roller for continuous monitoring of the profile of a strip, and can be used especially to detect planarity defects in a passing taut strip, such as a metal sheet during or after a rolling or drawing operation.

BACKGROUND OF THE INVENTION

During the rolling of metal strips, and particularly of cold rolled thin strip, planarity defects appear, due particularly to different relative reduction transversely thickness of the strip to the rolling direction. These parts which undergo different reductions have a tendency to elongate likewise in different ways, and a state of internal stress therefore occurs within the metal sheet which, when the material is not sufficiently thick and rigid, is expressed in planeity defects such as pockets in the center of the metal sheet or waves on its edges.

These planeity defects must be detected in order to remedy them by influencing the rolling conditions, and in any case in order to monitor the quality of the product at the end of the operation. For this purpose, a deflecter roller is generally used, over which the metal sheet to be monitored is passed under tension, this monitoring roller generally consisting of a tubular wall mounted rotatably about an axis perpendicular to the direction of travel of the strip, and on the circumference of which an array of pick-ups are placed, arranged in at least one series comprising a plurality of pick-ups distributed over the length of the roller in a direction substantially parallel to the axis of rotation.

The pick-ups are fitted detachably in housings made in the tubular wall, and normally open on the interior face of the latter, the end of the housing facing the exterior being enclosed by a thin envelope which may be applied on the tubular wall by hooping. In order to facilitate the fitting of the pick-ups, the latter may be threaded into orifices machined in the interior wall and each fixed on the latter by a flange.

In a further embodiment, the pick-ups are arranged in a plurality of mutually spaced series so as to cover the circumference of the roller. In each series, the pick-ups may advantageously be spaced slightly on either side of a mean direction parallel to the axis of the roller, and their longitudinal positions are moreover determined so that they are distributed along a helicoidal line winding in a plurality of turns over the entire length of the roller thus, the pick-ups cover the entire width of the metal sheet, passing successively beneath the part of the latter resting upon the roller during one or more turns of the latter.

In order to detect accurately the planarity defects resulting from the state of stress detected by the pick-ups, the latter must be positioned and oriented within their respective housings with great precision, adjusting the zero of each one. Furthermore, considering the pick-ups placed along one and the same generatrix of the roller, it is preferable to effect a slight angular offset of the pick-ups relative to each other, and since the pick-ups are normally fitted through the interior of the interior tubular wall of the roller, their precise fitting and adjustment constitutes a long and onerous operation. Moreover, generally speaking, the maintenance of the whole assembly is rather difficult and expensive.

SUMMARY OF THE INVENTION

The object of the invention is a novel mode of positioning and fixing the pick-ups, enabling all these disadvantages to be overcome.

According to the invention, all the pick-ups of the series are fitted on a straight support bar centered on the mean direction of the series, said bar being applied against the interior face of the envelope and maintained in position by detachable fixing means.

In the case where the pick-ups are arranged in a plurality of series, each comprising a plurality of pick-ups distributed along a mean direction parallel to the axis of the roller, the roller is equipped with a plurality of straight support bars, each of a series of pick-ups, each bar being centered according to the mean direction of the corresponding series.

Each bar is applied to the interior face of the tubular wall along a cylindrical support face of the same diameter, and the bars are maintained spaced from one another by chocks fixed on the interior face of the wall.

With particular advantage, each bar is equipped, at the level of each pick-up, with a lamella defining a support plane of a fixing flange of the pick-up and in the center of which a passage and centering orifice for the pick-up leading into the corresponding housing of the tubular wall and centered according to a radial axis more or less inclined relative to a median plane passing through the axis of the roller and the longitudinal axis of the bar as a function of the position of the pick-up, each lamella being perpendicular to the corresponding radial axis.

The pick-ups are connected to a measuring instrument such as a gathering chain through the intermediary of a rotary collector to which the various pick-ups are connected, each through the intermediary of an individual transmission cable for the information detected. According to an advantageous arrangement of the invention, each bar is equipped with a longitudinal groove in which the individual cables corresponding to the pick-up carried by the bar pass, and which are connected to the rotary collector through the intermediary of a common connector placed at the corresponding end of the bar.

In a particular embodiment, the checks positioning the bars relative to each other are equipped with longitudinal faces to guide and maintain the bars extending over at least a part of the length of the roller. In this way, the guide chocks being fixed on the interior wall of the tubular envelope, it is possible to place the pick-ups on the bars beforehand and to introduce the latter one after the other into the interior of the roller, applying them between the corresponding chocks on the interior face of the wall and fixing them in this position by maintaining braces placed at both ends of the roller.

The invention will be better understood by the following description of an exemplary embodiment thereof illustrated in the accompanying drawings, wherein.

DESCRIPTION OF PREFERRED EMBODIMENT

Figure 1:
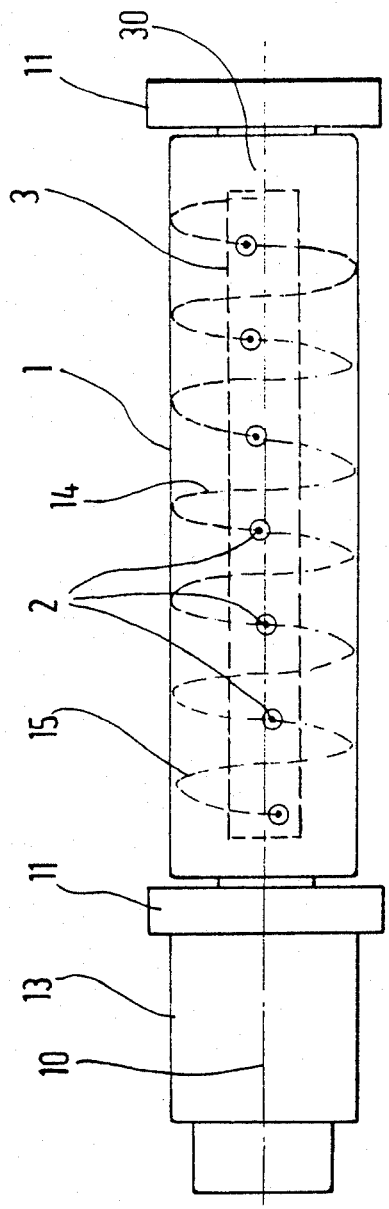
FIG. 1 is a diagrammatic top plan view of a monitoring roller.

FIG. 1 shows a monitoring roller 1 supported at its ends by two bearings 11, and on which a plurality of pick-ups 2 are fitted, one series of such pick-ups being illustrated in the figure, the pick-ups being connected to a measuring instrument such as a gathering chain through the intermediary of a rotary collector 13.

According to a well-known arrangement, the pick-ups are spaced from one another on the circumferences of the roller and are arranged along a line 15 wound spirally so as to form series each extending over the entire length of the roller covered by the metal sheet along a mean direction 30 parallel to the axis 10 of the roller. However, as illustrated in FIG. 1, it is customary to offset the pick-ups 2 of a given series slightly to either side of the mean direction 30.

Figure 2:
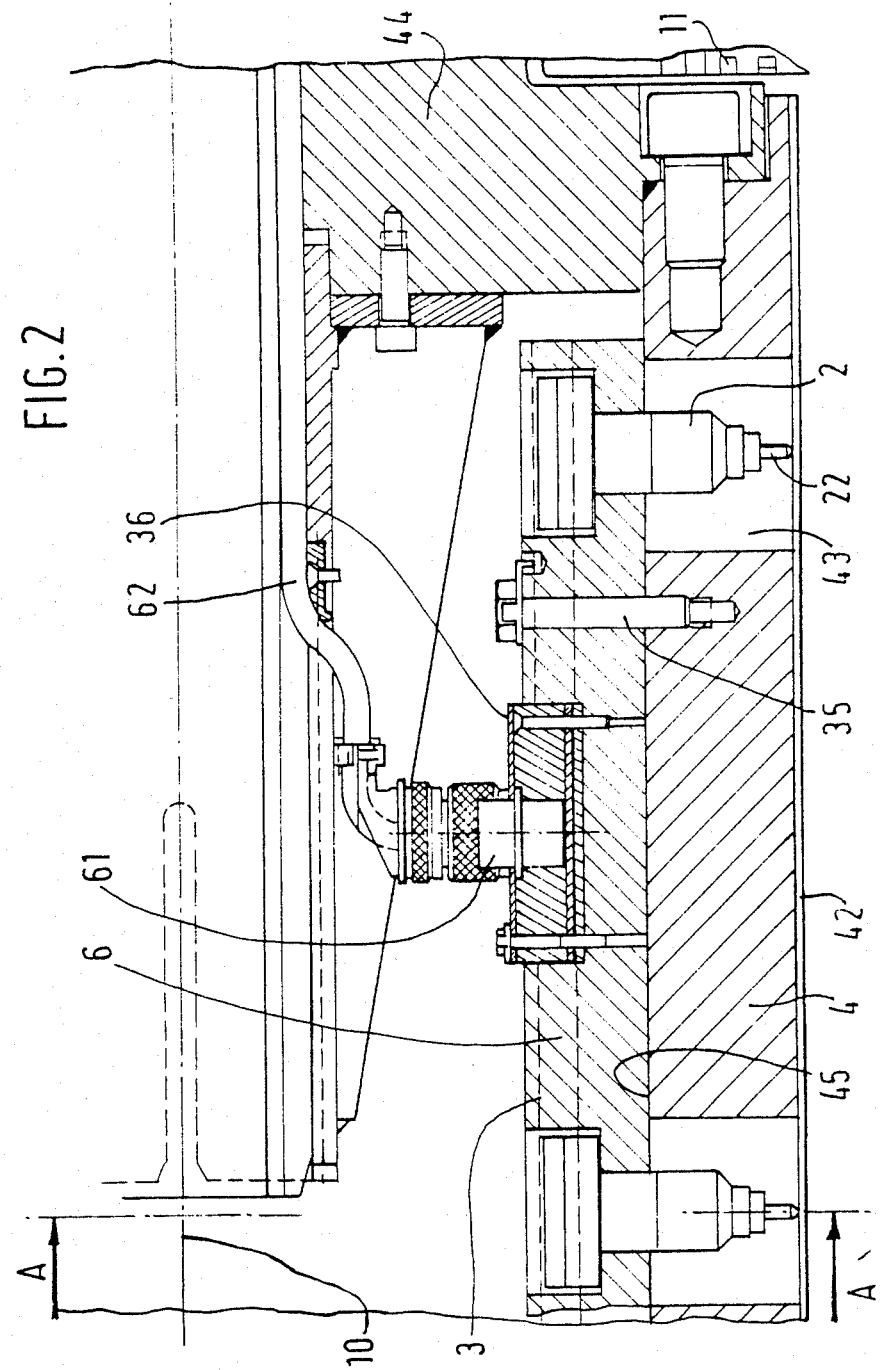
FIG. 2 is a detail view of the end of the monitoring roller, in longitudinal section through a plane passing through its axis.
Figure 3:
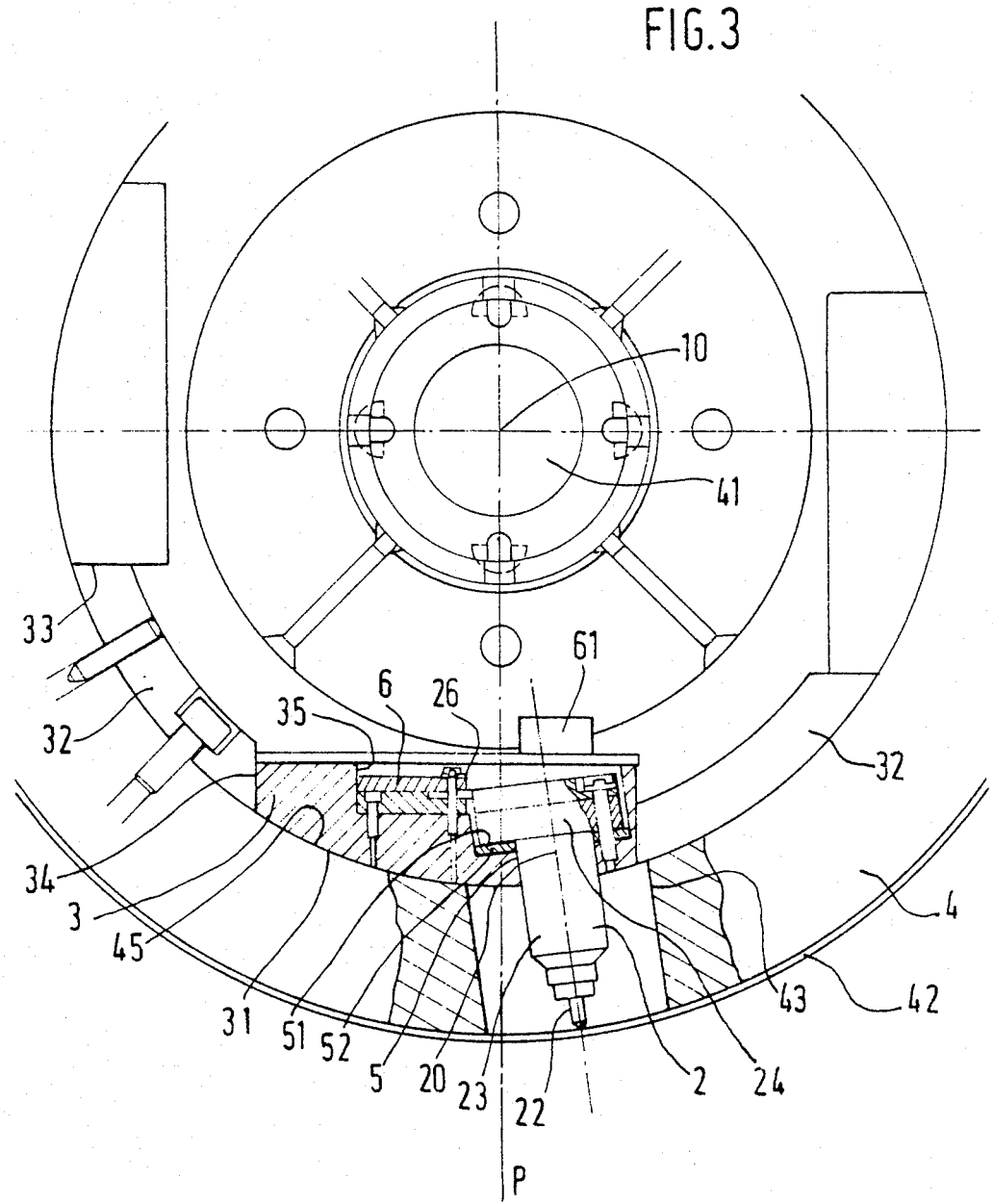
FIG. 3 is a detail view in cross-section through a plane A—A (FIG. 2) passing through the axis of a pick-up.
Figure 4:
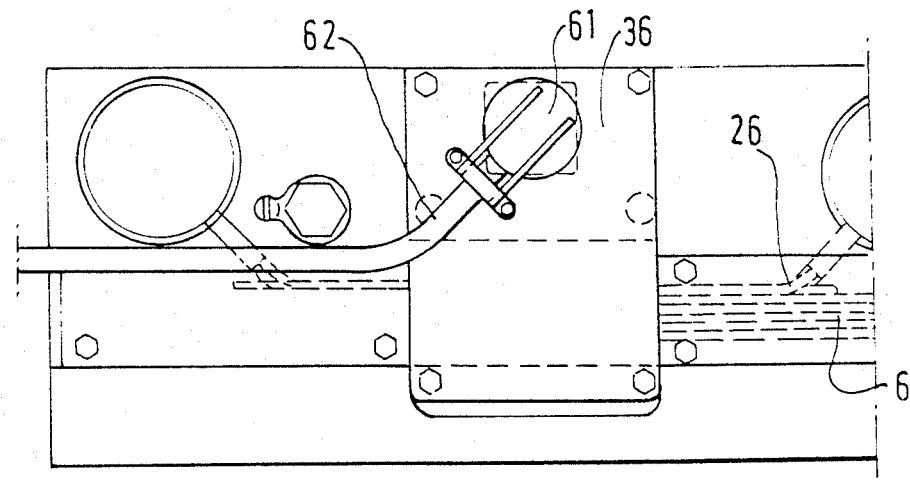
FIG. 4 is a bottom plan view of the end of a bar.

According to the invention, the pick-ups 2 of a given series are fitted on a bar 3 parallel to the axis 10 of the roller and shown in greater detail in FIGS. 2, 3 and 4, which show the end of the bar facing the collector 13.

As shown in FIGS. 2 and 3, the monitoring roller consists of a tubular wall 4 mounted rotatably about an axis of rotation 10 and covered externally with a thin envelope 42 generally fixed by hooping. Orifices 43 extend radially through the tubular wall 4 and lead into the interior of the latter; they are closed to the outside by the thin envelope 42, and a pick-up 2 is placed in each orifice 43 so that the sensing element 22 of the pick-up 2 is applied against the interior face of the envelope 42. In the embodiment illustrated, the tubular wall 4 is centered on the rotational axis 10 through the intermediary of webs 44 attached to its ends, and on which journals are fitted rotating in bearings 11, but other embodiments could obviously be adopted.

FIG. 2 illustrates the last two pick-ups of a series fitted on a bar 3 which, as shown in FIG. 3, consists of a profiled rule exhibiting, on the side of the interior face 45 of the wall 4, a cylindrical support face 31 of the same diameter as the face 45, so as to permit the bar 3 to be correctly fitted to the tubular wall 4.

The bars 3 are mutually separated by maintaining chocks 32 likewise having cylindrical application face complementary to the interior face 45 of the wall 4 upon which they are fixed, and each chock 32 is provided with two guide faces 33, 34. The opposite faces 33, 34 of two successive chocks 32 are parallel and spaced by a distance equal to the width of the bar 3, which can thus be threaded into the vacant space thus made and be applied against the interior face 45.

Figure 5:
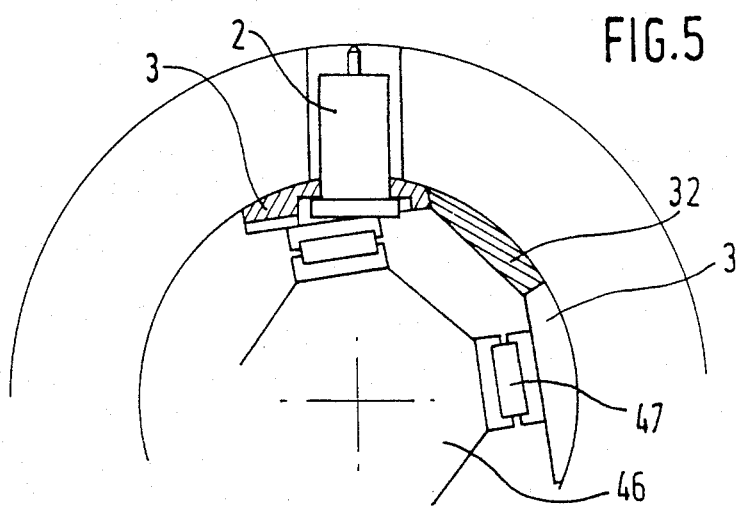
FIG. 5 is a diagrammatic cross-section view illustrating a method of fixing the bars.

In the example illustrated in FIG. 2, each bar 3 is fixed to the tubular wall 4 by screws 35, but other methods of fixing may obviously be employed in order to effect a detachable fitting of the bars. For example, in FIG. 5, the bars 3 are maintained in position by braces 46 placed at both ends of the roller, and against which the various bars 3 are applied through the intermediary of locking keys 47.

The pick-ups 2 may be of any conventional type permitting the measurement either of the deformation of the envelope 42, or of the stress applied locally to the latter, and generally comprise a sensor 22 fitted slidably on a cylindrical body 23 centered on an axis 20. For the fitting of the pick-ups 2, each bar is therefore provided in the required places with passage and centering orifices 5 of a diameter equal to that of the bodies 23 of the pick-ups 2, which are threaded into the orifices. Each orifice 5 is provided towards the inside with a lamella 51 perpendicular to the axis of the orifice and constituting a plane support face for a fixing flange 24 placed at the base of the pick-up. It is therefore the lamella 51 and the orifice 5 which determine the precise positioning and orientation of the pick-up 2, the latter leading into a corresponding orifice 43 made in the tubular wall 4, which need not be positioned with great precision, and the diameter of which is determined simply as a function of the characteristics of the exterior envelope 42 so that the part of the latter to which the sensor 22 is applied is sufficiently strong and sensitive to the variations in the stress applied by the metal sheet.

By virtue of this arrangement, it is possible to determine on the bar itself, and before fitting to the roller, the future orientation of the support face constituted by each lamella 51, and also of the axis of the corresponding orifice 5, and also to adjust coarsely the radial positioning of each pick-up, for example by means of thickness shims 52, so as to adjust the zero of the pick-ups.

On the other hand, each lamella 51 leads into a longitudinal groove 35 which extends over the total length of the bar 3, and in which are placed the individual cables 26 by which the measurement information emitted by each pick-up 2 is transmitted to the rotary collector 13. According to another advantageous feature of the present invention, all the individual cables 26 of the pick-ups 2 of a given series are grouped in a cable guide 6, made of teflon, for example, which may consist of a series of superposed layers in which passage grooves are made for cables 26 so that the latter are held perfectly in position and leave the cable guide each at the level of a pick-up 2. The cable guide 6 is placed in the groove 35 and leads all the individual cables 26 to a common connector 61 which is connected to the rotary collector 13 by a common branch cable 62.

The connector 61 is fixed to the end of the bar 3 by a connecting block 36 which covers the ends of the cables 26 coming from the various pick-ups; however, the latter may be located on one or the other side of the connector 61.

By virtue of the arrangements just described, it is possible to equip each bar 3 beforehand with the corresponding pick-ups 2, the individual cables 26 of which are branched to the connector 61 and maintained by the cable guide 6. Each bar thus equipped can be introduced inside the tubular envelope 4, nested between the two chocks 32 which fix its position, and fixed by screws 35, for example. The end of the wall 4 is then closed by the web 44, making the branch cables 62 pass from each connector 61 to the collector 13.

I claim:

1. A roller for continuous monitoring of the profile of a strip, said roller comprising a tubular wall (4) mounted for rotation about an axis of rotation (10), said strip moving in a direction perpendicular to said axis of rotation, said roller having a length and a circumference, a plurality of pick-ups (2) arranged on said circumference of said roller in at least one series (21) comprising a plurality of pick-ups distributed over said length of said roller in a direction (30) generally parallel to said axis of rotation (10), said pick-ups (2) being located in housings (43) in said tubular wall (4) and opening at least on an interior face of said tubular wall for the detachable fitting of said pick-ups (2), wherein said pick-ups (2) are fitted on a straight support bar (3) centered on said direction (30), said bar (3) being applied against said interior face (45) of said tubular wall (4) and maintained in position by detachable fixing means.

2. The monitoring roller as claimed in claim 1, wherein the pick-ups (2) are arranged in a plurality of series (21) each comprising a plurality of pick-ups distributed along said generally parallel direction (30), and comprising a plurality of straight support bars (3), each of a series of pick-ups, each bar being centered according to the mean direction (30) of the corresponding series.

3. The monitoring roller as claimed in claim 2, wherein each bar is applied to the interior face of the tubular wall (4) along a cylindrical support face of the same diameter, and comprising chocks (32) fixed to the interior face of the wall (4) for maintaining a spacing between said bars.

4. The monitoring roller as claimed in claim 3, wherein the chocks (32) positioning the bars (13) relative to each other have longitudinal faces (34) to guide and maintain the bars (3) extending over at least a part of the length of the roller (1).

5. The monitoring roller as claimed in claim 4, wherein said pick-ups (2) are pre-attached to said bars (3) and, said chocks (32) being attached to said interior face (45) of said tubular wall (4), said bars (3) with said pick-ups are introduced in sequence into the interior of said roller (1), applied between corresponding chocks (32) on said interior face (45) and fixed in that position.

6. The monitoring roller as claimed in claim 5, wherein said bars (3) are attached to the interior face (45) of said wall (4) by maintaining braces placed at least at each end, and bear upon each bar through the intermediary of a locking key.

7. The monitoring roller as claimed in claim 1 or 2, wherein each bar (3) is equipped at the level of each pick-up with a lamella (51) defining a support plane of a fixing flange (24) of the pick-up (2), and in the center of which a passage and centering orifice (5) is made for the pick-up (2), leading into the corresponding housing (43) of the tubular wall (4) and centered on a radial axis (50) more or less inclined as a function of the position of the pick-up relative to a median plane passing through said rotational axis (10) of said roller and the direction (30) of said bar, each lamella (51) being perpendicular to the corresponding radial axis.

8. The monitoring roller as claimed in claim 1 or 2, wherein, each said pick-up (2) being connected to a measuring means (12) by an individual transmission cable (62) for the information detected, individual cables (62) corresponding to the pick-ups (2) of a given bar are arranged in a longitudinal groove (35) extending along said bar (3), said bar being provided at its end with a connector (61) connected to said measuring means (12) by a rotary collector (13), and on which the corresponding individual cables (62) are branched.

* * * * *